United States Patent [19]

Jung et al.

[11] Patent Number: 4,613,491

[45] Date of Patent: Sep. 23, 1986

[54] REDISTRIBUTION CATALYST AND METHODS FOR ITS PREPARATION AND USE TO CONVERT CHLOROSILICON HYDRIDES TO SILANE

[75] Inventors: Il N. Jung; Ko D. Cho, both of Seoul, Rep. of Korea; John C. Lim, Claremont, Calif.; Bok-Ryul Yoo, Kyungki, Rep. of Korea

[73] Assignee: Korea Advanced Institute of Science and Technology, Seoul, Rep. of Korea

[21] Appl. No.: 733,883

[22] Filed: May 14, 1985

[51] Int. Cl.[4] ............................................ C01B 33/04
[52] U.S. Cl. ................................ 423/347; 423/342; 502/62; 502/159; 502/167
[58] Field of Search ............................. 423/342, 347

[56] References Cited

U.S. PATENT DOCUMENTS 3,968,199  7/1976  Bakay ................................. 423/347
4,113,845  9/1978  Litteral .............................. 423/342

FOREIGN PATENT DOCUMENTS 156907  9/1984  Japan ................................. 423/347

*Primary Examiner*—Patrick P. Garvin
*Attorney, Agent, or Firm*—Plante Strauss & Vanderburgh

[57] ABSTRACT

There is disclosed a redistribution catalyst which is the reaction product of a quaternary ammonium halide salt or tertiary amine, and an inorganic carrier having surface hydroxyl groups, such as silica, zeolite, clays, and silicone resins. The catalyst is useful for the disproportionation of chlorosilicon hydrides to dichlorosilane and silane at reaction conditions including a temperature from 0° to 200° C., in liquid or vapor phase with a pressure from 0.1 to 10 atmospheres.

19 Claims, No Drawings

REDISTRIBUTION CATALYST AND METHODS FOR ITS PREPARATION AND USE TO CONVERT CHLOROSILICON HYDRIDES TO SILANE

BACKGROUND OF THE INVENTION

1. Field of the Invention

This invention relates to immobilized catalysts on inorganic carriers such as silica, their preparation and their use for disproportionation of chlorosilicon hydrides to silane.

2. Description of the Prior Art

The addition of chlorosilicon hydrides to various unsaturated organic compounds offers a synthetic route to many organochlorosilianes which are useful for many industrial purposes (E. Y. Lukevitts and M. G. Voronkov, "Organic Insertion Reactions of Group IV Elements", Consultants Bureau, New York, 1966). In particular, trichlorosilane is commercially used as the starting material for the production of very high purity silicon for the electronics industries (F. A. Padorvani, U.S. Pat. No. 4,092,466). The pyrolysis of chlorosilane to metallic silicon is known as Siemens Process. Extensive developmental work has been recently conducted to reduce the energy costs for that process by substituting trichlorosilane with other silanes such as dichlorosilane or silane which decompose at lower temperature than trichlorosilane (L. H. Coleman, U.S. Pat. No. 4,340,574). Union Carbide Corporation has patented a process which incorporates redistribution of chlorosilanes to silane and silane decomposition.

Chlorosilicon hydrides such as chlorosilanes can be prepared by reacting metallic silicon directly with hydrogen chloride in the presence of copper catalyst. This process is commercially performed using a fluidized-bed reactor to control the reaction temperature, because it is exothermic. The reaction temperature is controlled carefully to maximize the yield of trichlorosilane, for otherwise, tetrachlorosilane will be the major product. With careful control of the process, trichlorosilane can be obtained up to 80% of the products and silicon tetrachloride will be about 15%. However, the reaction gives only trace amount of dichlorosilane which is expected to be the major product. This is why dichlorosilane is usually prepared by redistributing trichlorosilane (C. J. Litteral, U.S. Pat. No. 4,113,845).

The Lewis acid type catalyst such as aluminum trichloride, boron trichloride, etc. are reported to be active for the disproportionation of chlorosilanes, e.g. see U.S. Pat. Nos. 2,627,451 and 2,735,861. Organic compounds such as tertiary amines, quaternary ammonium compounds, nitrile compounds, phosphines, etc. are also suggested in U.S. Pat. Nos. 2,732,282 and 3,928,542 as catalysts for the reactions, such as the following:

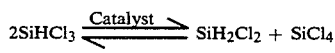

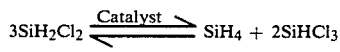

The reaction, however, requires the reaction temperatures as high as 200° C. and the reactor must be kept under high pressure because of the low boiling points of the chlorosilanes. Temperatures greater than 300° C. are also required for the catalysts of alkaline metal salts, as shown by M. Kinger in U.S. Pat. No. 3,627,501. Because of the harsh conditions of temperature and pressure, these inorganic compounds are unsuited for a continuous type industrial process.

Although the reaction proceeds at relatively lower temperature with organic catalysts, than with inorganic catalysts, very efficient distillation is required to separate the organic catalyst from the products since the organic catalysts are usually used as homogeneous, soluble catalysts.

Union Carbide's U.S. Pat. No. 3,928,542 to C. Bakey and U.S. Pat. No. 4,113,845 to C. Litteral disclose the use of various, solid amine ion exchange resins for the disproportionation of chlorosilane, thereby immobilizing the catalyst for hetergeneous catalysts. One of the important, immobilized catalysts developed commercially for this purpose is Amberyst A-21, a trade mark of Rohm and Haas company, Philadelphia Pa. This catalyst is a macroreticular styrene divinylbenzene copolymer resin bearing pendant benzyldimethylamine groups. Union Carbide Corporation has also patented the processes for the redistribution of trichlorosilanes, using Amberyst A-26 or Amberitre IRA-400, which are ion exchange resins that are exchanged with quarternary ammonium compounds.

The commercial catalyst for the disproprotionation of chlorosilanes has several disadvantages. Because the catalyst is a benzyl amine or ammonium complex, gradual degradation takes place due to the loss of the amine group from the benzyl sites. In addition, the organic backbone of a styrene divinylbenzene copolymer is susceptible to swelling and shrinking. This mandates very careful control of the composition of reaction stoichiometry and temperature to prevent restrictions in flow through the reactor catalyst beds.

Inorganic materials such as silica, zeolite, etc. have hydroxyl groups on the surface that can be used as the site to couple with organotrialkoxysilanes, as suggested by F. R. Hartley and P. N. Vezey, Adv. in Organometal. Chem., V 15, 189 (1978). Treating inorganic fillers with coupling agents is being commercially practiced in the plastic industries.

BRIEF DESCRIPTION OF THE INVENTION

We have found that certain inorganic materials, which have surface hydroxyls available for reaction may be treated with certain tertiary amine or quarternary ammonium salt substituted alkyl alkoxysilane compounds to produce a very stable catalyst which is very useful in the redistribution of chlorosilicon hydrides to silane, at mild conditions. As the catalyst is quite stable it is well suited for use in a packed reactor for continuous flow processes.

DESCRIPTION OF PREFERRED EMBODIMENTS

This invention comprises the preparation of a catalyst by the reaction of certain inorganic materials, which have surface hydroxyls available for the reaction, with with certain tertiary amine or quarternary ammonium salt substituted alkyl alkoxysilane compounds of the following General Formula I:

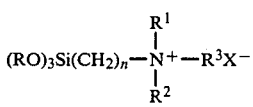

wherein:

n is 1 to 4;

R is alkyl having 1 to 4 carbons;

$R_1$ and $R_2$ are the same or different alkyl or aryl groups having 1 to 8 carbons;

$R_3$ is an alkyl- or dialkyl- amino substituted alkyl having 1 to 20 carbons, with the alkyl groups of the amio group being monovalent alkyl or heterocyclic ring having 1 to 10 carbons; and X is chloride, iodide, or bromide.

The reaction proceeds generally as set out in the following equation:

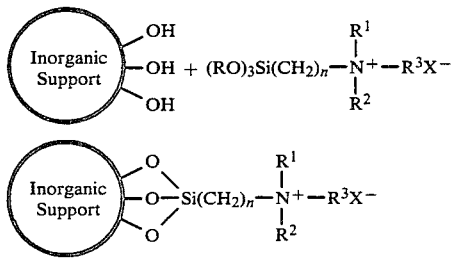

The reaction gives new immobilized catalysts for the disproportionation of chlorosilicon hydrides to silane, and the invention also comprises these new catalytic compositions. Since the densities of these immobilized catalysts are higher than the organic solid catalysts, it is easier to pack them in a reactor without creating high pressure drop for continuous flow processes. The degradation problem of the amino groups is reduced because the inorganic material is chemically bound with the amino sites through aliphatic chain. Accordingly, the invention also comprises the method of using these new catalytic compositions as catalysts in the redistribution of chlorosilicon hydrides to silane.

The compounds of general formula I can also be converted to a solid resin catalyst by cohydrolyzing with the compounds of following, General Formula 2 without reacting with inorganic supports.

General formula 2:

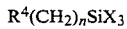

wherein:

n is 1 to 4;

X is halide or alkoxy having 1 to 4 carbons; and $R^4$ is hydrogen, alkyl, or aryl having a functional group of the class of —SH, —CN,

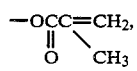

pyrrolidine, and alkyl amino having 1 to 4 carbons.

The reaction proceeds in accordance with the following equation:

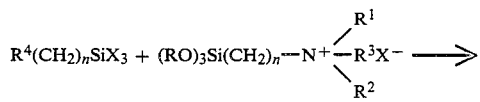

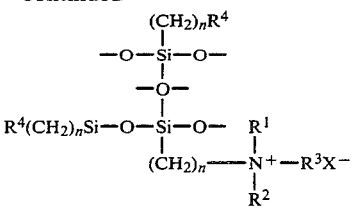

The compound represented in General Formula 1 and silica gel may be reacted and coupled with each other through chemical bond by hydrolyzing in 40–70% methanol solution of the compound on the surface of silica gel. The reaction proceeds faster when dilute hydrochloric acid solution is used for the hydrolysis. A certain amount of the tertiary amine substituted compound as represented in General Formula 2 may be used in combination with the above compound for the hydrolysis. The solid catalysts obtained from the hydrolysis may be filtered, washed with absolute ethanol, and dried at the temperature below 150° C. in a vacuum oven.

Zeolite 13X may be treated with an ammonium chloride solution to replace sodium with ammonium ions. The ammonium exchange zeolite is heated to deammoniate the solid in the manner described by D. W. Breck, "Zeolite Molecular Sieves", Wiley, New York 1974. This zeolite may be used as the support for immobilizing amines. When the amine substituted organosilicon coumpounds are hydrolyzed on this zeolite, dibutyltindilaurate can be used as a catalyst for the coupling between the support and organosilicon compound.

The solid silicon resin can be prepared by cohydrolyzing a methanol solution of compound represented as a general formula 1 and compound represented in general formula 2 in the presence of dilute hydrochloric acid. The resulting solid is filtered, washed twice with absolute ethanol, and dried in vacuum oven to give the tertiary amine and quarternary ammonium salt, immobilized cataytst on a solid silicon resin.

One of the advantages of the novel catalysts of this invention is that the pressure drop problem of the catalytic bed can be easily solved by choosing the appropriate form of inorganic supports which are commercially available and have higher densities than organic materials. The catalysts are suitable for the batch or continuous process of the disproportionations of chlorosilanes.

The disproportionation process using the catalysts of this invention may be practiced at temperatures as low as about 0° C. to as high as about 200° C., although the preferred operating temperatures are typically about 20° C. to about 100° C.

The process may be carried out under subatmospheric, atmospheric, or superatmospheric pressure. Since the boiling points of chlorosilicon hydrides are relatively low, pressure must be applied in order to maintain liquid phase process in which these silanes are present at the temperature range. The process, however, can be carried out in liquid phase or in vapor phase, preferably using a continuous flow process. Useful pressures are from about 0.1 to about 10 atmospheres, preferably from about 0.5 to about 5 atmospheres. If desired, an inert gas can be introduced to carry or sweep the reactants through the reactor, particularly when operating in the vapor phase. Suitable gases for this purpose are nitrogen, argon, and mixtures thereof.

Beside the temperature and pressure of the process, another critical factor is the contact time between the immobilized catalyst and the silane. At a given temperature, there is an independent period of time in which such monomer feed should be in contact with the catalyst to reach ultimate equilibrium. In a batch process the equilibrium is the function of the catalyst concentration. In a continuous process the required contact time can be obtained by increasing the length of catalytic bed and/or by reducing the flow rate of feed. For most reactions, the space velocity, expressed as cubic meters of reactant per hour per cubic meter of catalyst can be from 10 to about 150, preferably from about 40 to about 60.

The invention will be further illustrated by the following examples. It is, however, not intended that this invention will be limited by the examples.

EXAMPLE 1

To a one liter, three-neck, round-bottomed flask equipped with a mechanical stirrer, a dropping funnel, and a reflux condenser, are added 200 grams of silica gel flake and 200 grams (0.16 moles) of 40 weight percent solution of 3-trimethoxysilylpropyloctadecyldimethyl ammonium chloride in methanol. To this mixture, 300 milliliters of water acidified with a few drops of concentrated hydrochloric acid was then added dropwise with stirring through the dropping funnel. The solution was stirred for another hour after the addition. The solid was filtered and washed twice with 200 milliliters of absolute ethanol, and then, 200 milliliters of benzene was added to the catalyst and the catalyst was dried by distilling a benzene-water azeotrope to give 256 grams of the product.

EXAMPLE 2

To a 300 milliliter pyrex glass tube (400×250 mm.) fitted with a Corning Rotaflo stopcock, were charged 100 grams of the immobilized catalyst prepared in example 1 and 150 milliliters of trichlorosilane. After the Teflon stopcock was closed, the solution was heated to 100° C. for one hour to give 80.9% $HSiCL_3$, 9.52% $SiCl_4$, 8.81% $H_2SiCl_2$ and 0.24% $H_3SiCl$, according to the gas chromtogram.

EXAMPLE 3

100 grams (0.16 moles) of 40% methanol solution of 3-trimethoxysilyl-propyltrimethyl-ammonium chloride was reacted with 200 grams of silica gel as described in example 1 to prepare trimethyl-ammonium chloride immobilized catalyst.

EXAMPLE 4

Dichlorosilane was disproportionated in the reactor used in Example 2 using the catalyst prepared in example 3 to give 10.6% $SiH_4$, 27.0% $SiHCl_3$, 16.8% $SiH_3Cl$, and 0.2% $SiCl_4$.

EXAMPLE 5

The reactor for the continuous disproportion at above the boiling point of trichlorosilane was constructed with 316 type stainless steel tube 60 centimeters long with a 1.2 centimeter diameter. Three hundred grams of the catalyst prepared in Example 1 was charged to the reactor and heated to 80° C. by using heating tape. $SiHCl_3$ was fed as vapor to the reactor through a vaporizer that was preheated to 60° C. and the flow was controlled to provide 20 to 30 minutes of contact time. The products obtained were analyzed by on-line gas chromatography to determine their composition to be 4 to 8% $H_2SiCl_2$, 6 to 12% $SiCl_4$, and 0.02 to 0.03% $SiH_3Cl$.

EXAMPLE 6

0.01 moles of dimethylaminopropyltrimethoxysilane and 0.16 moles of 3-trimethoxysilyl-propyloctadecyldimethyl-ammonium chloride were mixed and coupled with 200 grams of silica gel using the same procedure described in Example 1.

EXAMPLE 7

To a solution of 0.05 moles of 3-trimethoxysilyl-propyloctadecyldimethyl-ammonium chloride in 38 grams of methanol was added 94 grams (0.5 moles) of 3-cyanopropyltrimethoxysilane. To the stirred mixture was added 300 milliliters of water. After stirring the solution for one hour, an additional 100 milliliters of 1N hydrochloric acid solution was added and the mixture was refluxed for 30 min. to complete the hydrolysis. The resulting solid resin was filtered and washed twice with 200 milliliters of absolute ethanol, and then dried in a vacuum oven.

EXAMPLE 8

The catalyst prepared using this procedure is described in Example 1 except 3-trimethoxysilyl-propylactedecyldimethyl ammonium chloride was replaced by 3-trimethoxysilyl-propylbenzyldimethyl ammonium chloride.

EXAMPLE 9

The catalyst was prepared using the same procedure as described in Example 6 except dimethyl propyl trimethoxy silane was replaced by 0.01 moles of pyrrolydil-propyl trimethoxysilane.

EXAMPLE 10

To a solution of 29 grams of ammonium chloride in 120 milliliters of water was added 120 grams of zeolite (13×) pellet to replace the sodium ions of the zeolite with ammonium ions. The solution was warmed to 80° C. and left for 2 hours. The pellet was then filtered and soaked in another ammonium chloride solution as described above.

The ammonium exchange zeolite was filtered, dried at 100° C. in an oven for one hour, and baked at 300°–400° C. for two hours to decompose the ammonia from the zeolite.

The zeolite was used as the inorganic support for immobilizing amine catalysts as described in Examples 1 and 6.

EXAMPLE 11

The procedure of Example 1 was repeated using a methanol solution of 3-trimethoxysilyl-tetramethylene propylamine, to prepare a catalyst bonded to a silica gel support. This catalyst was identified as KD-1 and used in a series of disproportionation reactions, at varied temperatures and residence time (flow rates). The results are presented in Table 1.

EXAMPLE 12

The procedure of Example 11 was followed, however, Chromosorb P, a commercially available form of spherical granules, was substituted for the silica gel. This catalyst was identified as KD-2 and used in the series of disproportionation reactions, with the results reported in Table 1.

EXAMPLE 13

The procedure of Example 11 was again followed, however, an ammonium charged zeolite 4A was substituted for the silica gel used in Example 11. The ammonium zeolite was prepared by the procedure described in Example 10. The resultant solid was recovered, dried and used in the series of disproportionation reactions, with the results reported in Table 1.

EXAMPLE 14

The catalysts prepared in Examples 11-13 were tested in a continuous flow reactor substantially as described in Example 5, together with catalysts which were prepared as described in Example 1 (KD-3) and in Example 3 (KD-4). All the catalysts were tested for the disproportionation of dichlorosilane at a reaction temperature of 65° C., and at a rotometer flow rate of 25, corresponding to a space velocity of 20.6 cubic meters per hour per cubic meter of catalyst. The pressure was maintained from 25 to about 35 psi., to insure that the reactants and products were entirely in vapor phase. The results which were obtained are reported in the following Table 1:

TABLE 1

| Catalyst | SiH$_4$ | H$_3$SiCl | H$_2$SiCl$_2$ | HSiCl$_3$ | SiCl$_4$ |
|---|---|---|---|---|---|
| KD-1 | 16.1 | 10.8 | 34.2 | 38.2 | 0.7 |
| KD-2 | 13,2 | 14.1 | 36.3 | 36.0 | 0.5 |
| KD-3 | 17.1 | 9.8 | 32.8 | 39.6 | 0.7 |
| KD-4 | 6.5 | 16.8 | 49.6 | 27.0 | 0.2 |
| KD-5 | 16.0 | 10.8 | 34.4 | 38.2 | 0.5 |

The results obtained indicate that the catalyst has a high activity for the disproportionation of chlorosilanes.

The invention is intended to be unduly limited by the disclosure of the presently preferred embodiments which are illustrated by the specific examples. Instead, the invention is intended to be defined by the agents, and method steps, and their obvious equivalents, set forth in the following claims:

What is claimed is:

1. A process of disproportionation of a chlorosilane selected from the class consisting of trichlorosilane, dichlorosilane, monochlorosilane, and mixtures thereof to silane which comprises contacting the chlorosilane at a temperature between about 0° and 200° C. in the presence of a catalyst which comprises the solid reaction product of from 5 to 75 weight percent of:

(a) an active catalytic ingredient having the formula:

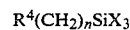

$$(RO)_3Si(CH_2)_nN^+R^3X^-$$

wherein:
   n is 1 to 4;
   R is alkyl having 1 to 4 carbons;
   R$_1$ and R$_2$ are the same or different alkyl or aryl groups having 1 to 8 carbons;
   R$_3$ is an alkyl- or dialkyl- amino substituted alkyl having 1 to 20 carbons, with the alkyl groups of the amino group being monovalent alkyl or heterocyclic ring having 1 to 10 carbons; and
   X is chloride, iodide, or bromide; and (b) the balance being a silicon containing carrier selected from the class consisting of: (i) a surface hydroxyl bearing solid selected from the class consisting of silica, zeolite, clay, solid silicone resin, and the hydrolyzed solid of silicon compounds having the formula:

$$R^4(CH_2)_nSiX_3$$

wherein:
   n is 1 to 4;
   X is halide or alkoxy having 1 to 4 carbons; and
   R$^4$ is hydrogen, alkyl, or aryl having a functional group of the class of —SH, —CN,

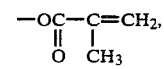

pyrrolidine, and alkyl amino having 1 to 4 carbons; and
   (c) mixtures thereof.

2. The process of disproportionation of claim 1 wherein said silicon containing carrier is a surface hydroxyl bearing solid.

3. The process of disproportionation of claim 2 wherein said solid is silica.

4. The process of disproportionation of claim 3 wherein said active ingredient of said catalyst is 3-trimethoxysilylpropyloctadecyldimethyl ammonium chloride.

5. The process of disproportionation of claim 3 wherein said active ingredient of said catalyst is 3-trimethoxysilylpropyltrimethyl ammonium chloride.

6. The process of disproportionation of claim 4 wherein said catalyst also includes the hydrolyzed product of dimethylaminopropyltrimethoxysilane.

7. The process of disproportionation of claim 4 wherein said catalyst also includes the hydrolyzed product of pyrrolydil-propyl trimethoxysilane.

8. The process of disproportionation of claim 4 wherein said silicon containing carrier is the hydrolyzed product of 3-cyanopropyltrimethoxysilane.

9. The process of disproportionation of claim 8 wherein said active catalytic ingredient is present at a concentration from 5 to about 20 weight percent of the weight of said catalyst.

10. The process of claim 1 including the step of maintaining the pressure during said contacting at a value sufficient to maintain a liquid phase.

11. The process of claim 1 including the step of maintaining the pressure during said contacting at a value sufficient to maintain an entirely vapor phase.

12. The process of claim 1 wherein said chlorosilane is trichlorosilane.

13. The process of disproportionation of claim 1 wherein said temperature is from 20° to 100° C.

14. The process of disproportionation of claim 11 wherein said process is practiced as a continuous flow process by continuously introducing said chlorosilane into a reactor containing said catalyst to contact said catalyst therein, and continuously withdrawing reaction product from the reactor.

15. The process of disproportionation of claim 14 wherein said chlorosilane is contacted with said catalyst at a space velocity from 10 to 150 cubic meters per hour per cubic meter of catalyst.

16. The process of disproportionation of claim 14 wherein said chlorosilane is contacted with said catalyst at a space velocity from 40 to 60 cubic meters per hour per cubic meter of catalyst.

17. The process of disproportionation of claim 14 including the introduction of an inert sweep gas to carry said chlorosilane through said reactor.

18. The process of disproportionation of claim 1 wherein said pressure is maintained from 0.1 to 10 atmospheres.

19. The process of disproportionation of claim 1 wherein said pressure is maintaied from 0.5 to 5 atmoshperes.

* * * * *

UNITED STATES PATENT AND TRADEMARK OFFICE
CERTIFICATE OF CORRECTION

PATENT NO. : 4,613,491
DATED : September 23, 1986
INVENTOR(S) : IL N. Jung et al It is certified that error appears in the above-identified patent and that said Letters Patent is hereby corrected as shown below:

On the title page insert Foreign Application Priority Data
-- May 17, 1984    Republic of Korea    2677
   May 17, 1984    Republic of Korea    2678 --.

Signed and Sealed this

Eighth Day of December, 1987

Attest:

DONALD J. QUIGG

*Attesting Officer*    *Commissioner of Patents and Trademarks*